United States Patent
Kahrl et al.

(10) Patent No.: US 12,190,350 B1
(45) Date of Patent: Jan. 7, 2025

(54) ADVERTISEMENT METRIC PREDICTION

(71) Applicant: Amazon Technologies, Inc., Reno, NV (US)

(72) Inventors: Phillip A. Kahrl, Mukilteo, WA (US); Michael Lee Loritsch, Kirkland, WA (US); Jody D. Biggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 16/991,709

(22) Filed: Aug. 12, 2020

Related U.S. Application Data (63) Continuation of application No. 13/606,909, filed on Sep. 7, 2012, now Pat. No. 10,789,619.

(51) Int. Cl.
  *G06Q 30/0251* (2023.01)
  *G06Q 30/0242* (2023.01)

(52) U.S. Cl.
  CPC ..... *G06Q 30/0254* (2013.01); *G06Q 30/0242* (2013.01)

(58) Field of Classification Search
  None
  See application file for complete search history.

(56) References Cited

U.S. PATENT DOCUMENTS

| | | | |
|---|---|---|---|
| 7,260,783 B1 * | 8/2007 | Mika | G06Q 30/02 715/744 |
| 7,870,023 B2 | 1/2011 | Ozar | |
| 10,789,619 B1 | 9/2020 | Kahrl et al. | |

(Continued)

FOREIGN PATENT DOCUMENTS

EP  2109077 A2  10/2009

OTHER PUBLICATIONS

Author(s):Costa, P Title:Socially aware routing for publish subscribe Journal: IEEE[online]. Publication date: Jun. 2008. [retrieved on: Jun. 14, 2022 ]. Retrieved from the Internet: < URL:https://ieeexplore.ieee.org/stamp/stamp.jsp?tp=&arnumber=4530732>(Year: 2008).*

(Continued)

*Primary Examiner* — Bion A Shelden
*Assistant Examiner* — Alfred H Tsui
(74) *Attorney, Agent, or Firm* — Eversheds Sutherland (US) LLP (57) ABSTRACT

Systems and methods are disclosed to update ads on user devices that may connect to a network only intermittently by predicting and tracking various metrics associated with ads delivered to the user devices. An example method may include determining a first set of ads that were presented at a first semi-connected device while the first semi-connected device was disconnected from a network, determining a first device identifier associated with the first semi-connected device, and determining, based at least in part on the first device identifier, a first estimated number of ad impressions for a first ad. Example methods may include determining, based at least in part on the first estimated number of ad impressions, that the first semi-connected device is to be updated with the first ad, causing the first ad to be sent to the first semi-connected device, and causing at least one ad of the first set of ads to be removed from the first semi-connected device.

20 Claims, 5 Drawing Sheets

(56) References Cited

U.S. PATENT DOCUMENTS

| | | | | |
|---|---|---|---|---|
| 2002/0023002 | A1* | 2/2002 | Staehelin | G06Q 30/0269 |
| | | | | 705/14.66 |
| 2004/0243623 | A1* | 12/2004 | Ozer | G06Q 30/0248 |
| | | | | 707/999.102 |
| 2008/0033798 | A1 | 2/2008 | Carey et al. | |
| 2009/0006177 | A1 | 1/2009 | Beaver et al. | |
| 2009/0055241 | A1* | 2/2009 | Chen | G06Q 30/0205 |
| | | | | 705/7.29 |
| 2010/0125491 | A1* | 5/2010 | Elliott | G06Q 30/02 |
| | | | | 705/14.4 |
| 2011/0040611 | A1 | 2/2011 | Simmons et al. | |
| 2011/0161462 | A1* | 6/2011 | Hussain | H04L 69/329 |
| | | | | 709/219 |
| 2012/0110620 | A1 | 5/2012 | Kilar et al. | |
| 2012/0220308 | A1* | 8/2012 | Ledlie | H04W 4/029 |
| | | | | 455/456.1 |

OTHER PUBLICATIONS

Author(s):Mahmoud Title: Location aware advertising in wireless mobile environments JournalElsevier[online]. Publication date: 2006. [retrieved on: Nov. 2, 2022 ]. Retrieved from the Internet: < URL:https://www.sciencedirect.com/science/article/pii/S1567422306000226> (Year: 2006).*

Author(s):Mahmoud Title: Location aware advertising in wireless mobile environments JournalElsevier[online]. Publication date: 2011. [retrieved on: Mar. 24, 2023 ]. Retrieved from the Internet: < URL:https://ieeexplore.ieee.org/stamp/stamp.jsp?tp=&arnumber=5876480> (Year: 2011).*

Author(s):sommer Title:Disconnected mobile ad hoc networks JournalIEEE[online]. Publication date: 2007.[retrieved on: Oct. 25, 2023 ]. Retrieved from the Internet: < URL:https://ieeexplore.ieee.org/abstract/document/4402817/> (Year: 2007).*

Author(s):sommer Title:forecasting ad impressions Journal ACM[online]. Publication date: 2009.[retrieved on:Apr. 19, 2024]. Retrieved from the Internet: < URL:https://dl.acm.org/doi/pdf/10.1145/1526709.1526776> (Year: 2009).*

Author(s):Haddadi, H Title:Targeted advertising on the handset Journal: Springerlink [online]. Publication date: 2011.[ retrieved on: Aug. 10, 2024]. Retrieved from the Internet: <URL: https://research-repository.st-andrews.ac.uk/bitstream/handle/10023/2027/advertising2011.pdf?sequence=1&isAllowed=y> (Year: 2011).*

Shahriyar Amini et al, "Cache: Caching Location—Enhanced Content to Improve User Privacy", ACM 978-1-4503-0643-0/11-06, MobiSys '11, Jun. 28-Jul. 2011, Bethesda, Maryland; 13 pages.

* cited by examiner

ADVERTISEMENT METRIC PREDICTION

CROSS-REFERENCE TO RELATED APPLICATION

This application is a continuation of U.S. Ser. No. 13/606,909, filed Sep. 7, 2012, the entirety of which is hereby incorporated by reference in its entirety.

BACKGROUND

Systems and methods for advertisement ("ad") delivery to networked user devices may consider various metrics associated with various ad content to determine which of the various ad content to deliver to the networked user devices. For example, ad decision servers and other systems may consider the number of ad impressions versus targeted ad impressions for a variety of ads when making a decision of which ad to deliver to a particular networked user device. In some cases, when user devices are only intermittently connected to a network, it may be difficult to receive metrics associated with a variety of ads displayed by the user device when the user device is not connected to the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Embodiments of the present disclosure are directed to, among other things, displaying advertisements ("ads") and deciding which ads to provide to user devices that may intermittently be connected to a network.

Embodiments of the disclosure pertain to systems and methods to predict and track various metrics associated with ads delivered to user devices that may connect to a network only intermittently. In other words, certain user devices may not be connected to a network at all times. These devices may be provided with ads to be displayed to users of the user devices when the user devices are not connected to a network. During times when the user device is connected to the network, the user device may receive new ads and/or receive instructions to remove ads from the user device. In one aspect, the ads may be stored in memory or cached on the user device while the user device is not connected to a network. While the user device is in use, but not connected to the network, the user device may render and/or display one or more ads to the user of the user device by accessing the ads from the memory of the user device. In one aspect, the user device may track metrics associated with the ads displayed to a user while the user device is not connected to the network. The tracked metrics may include, for example, impressions, click-throughs, or the like.

When the user device connects to the network and, in particular, to a device queue server, the ads on the user device may be updated. In particular, the device queue server may provide the user device with an indication of one or more ads to add to the ad cache of the user device and/or indications of ads to be removed from the user device. The device queue server may be updated by an ad server to provide the user device with ad update information. The ad server may receive information related to ads that are currently stored on the user device. This information may be received from a device ad database and/or a device iteration server. The ad server may process this user device related ad information and may provide the device queue server with an indication or instructions for updating the user device with new ads and/or instructions to purge one or more ads from its memory based at least in part on the information from the user device and ad metric models and/or estimates provided to the ad server by a predictive tracking server. In one aspect, the predictive tracking server may consider a variety of parameters associated with available ads, the user device, the user of the electronic device, and/or other parameters in providing the estimates of ad metrics.

In one aspect, the user device may be any suitable user device that may connect to a network intermittently including, for example, an electronic book reader (e-book reader). Such a user device may be used by a user for a variety of applications, such as reviewing media content or playing games, while the user device is not connected to a network. While the user device is not connected to the network, but is being used by the user of the user device, the user device may display one or more ads. Metrics and other data associated with the display of these ads, such as ad impressions, may be tracked by the user device while the user device is not connected to the network. When the user device does connect to a network, the user device may download content or other data that the user device may use for providing services to the users of the user device. In addition, the user device may update ads that may be displayed on the user device while the user device is disconnected from the network. Therefore, the user device, in certain embodiments, may communicate with one or more of a device queue server, a device iteration server, or an ad server to receive indications of updates to ads stored on the user device. In certain embodiments, the ad server may decide which ads should be added to the user device for display on the user device and/or removed from the user device. In one aspect, the user device may receive new ads and may receive an indication to purge and/or erase ads that should no longer be displayed to the user of the user device. In the same or further embodiments, the user device may transmit metrics associated with the ads that are stored on the user device. For example, the user device may provide information related to how many impressions of each ad stored on the user device have been made since the last time the user device was connected to the network and provided similar information.

In certain embodiments, an ad server may receive the information associated with cached ads on a particular user device. This information may include which ads are currently stored on the user device, such as for the purposes of displaying the ads to the user of the user device. The information may further include identifiers of each of the stored ads and/or one or more identifiers of the user device. This device related ad information may be received from a device ad database and/or a device iteration server. The ad server may have current predictions of metrics associated with ads that the ad server may provide to the user device responsive to receiving the information associated with cached ads on that user device. The predictions may include, for example, predictions of the number of impressions associated with a variety of ads expected on the user device. The ad server may determine, based at least in part on the current predictions of metrics associated with the ads, which ads available on the ad server may be provided to the user device for the purpose of displaying the ads on the user device. When the ad server makes a decision on how to update the ads on the user device, the ad server may transmit an indication of the updates to the particular user device to the device queue server, such as via the device iteration server. In particular, the indication of updates may include an indication of new ads to be provided to the user device or instructions to erase old ads from the user device. In one aspect, the user device may access an ad database to receive updates, such as new ads, to be stored on the user device. The ad database may, in certain embodiments, store currently available ads that may be provided to the user device or to other user devices. In certain embodiments, the device queue server, the ad server, and/or the user device may access one or more other servers to provide ads to the user device.

In certain embodiments, the ad server may receive updated predictive metrics from one or more predictive tracking servers. These predictive metrics may, in certain embodiments, be specific to the user device and/or the particular ad. In the same or further embodiments, the predictive metrics may be user specific. For example, the predictive tracking servers may have demographic information associated with the user associated with the user device to which ads are to be delivered by the ad server. The predictive tracking servers may be configured to use such demographic information and generate predictive metrics associated with the user device. In one aspect, the predictive tracking servers may have information associated with the ads that may be provided by the ad server to one or more user devices. The information, in some cases, may be related to various aspects of one or more ads, such as the size of those ads. The information may further include target metrics associated with the one or more ads. For example, a customer may want a certain number of impressions of its ad during a particular ad campaign. In this case, the predictive tracking servers and/or the ad servers may be aware of the target number of impressions. The predictive tracking servers may further provide information related to the number of impressions already rendered of one or more ads that may be served by the ad server. The predictive tracking servers may also store current metrics, as well as predictions of metrics associated with ads that may be delivered by the ad server. Further still, the predictive tracking servers may include models for making predictions related to the ads that may be delivered by the ad server. The predictive tracking servers may further be configured to update the metric prediction models that it may use to make predictions of ad-related metrics. In certain embodiments, the predictive tracking servers may receive new metric prediction models from other servers, such as one or more business intelligence servers.

In certain further embodiments, one or more business intelligence servers may be configured to receive ad metric data from the user device when the user device connects to the network. In one aspect, the business intelligence server may be configured to receive the ad metric data via one or more other servers, such as the device queue server, and/or the device iteration server. Therefore, the business intelligence servers may be configured to compare actual ad- and/or user-device-related metrics to corresponding respective predicted metrics. The business intelligence servers may be further configured to modify one or more estimation models based upon comparing actual ad metric data and corresponding respective predicted ad metric data. The business intelligence servers may yet further be configured to provide new and/or modified estimation models to the predictive tracking servers for the purposes of generating more accurate ad metric predictions.

The systems and methods disclosed herein may provide the ad server the ability to make decisions regarding which ads to provide to one or more user devices even though the ad server may not have exact metrics associated with ads that may be delivered to the user device. The ad server may indeed use estimates or predictions of metrics associated with ads on user devices that may be connected to a network only intermittently. Furthermore, the ad server may receive the estimates or predictions of ad-related metrics from a predictive tracking server to which the ad server may be communicatively linked.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1:
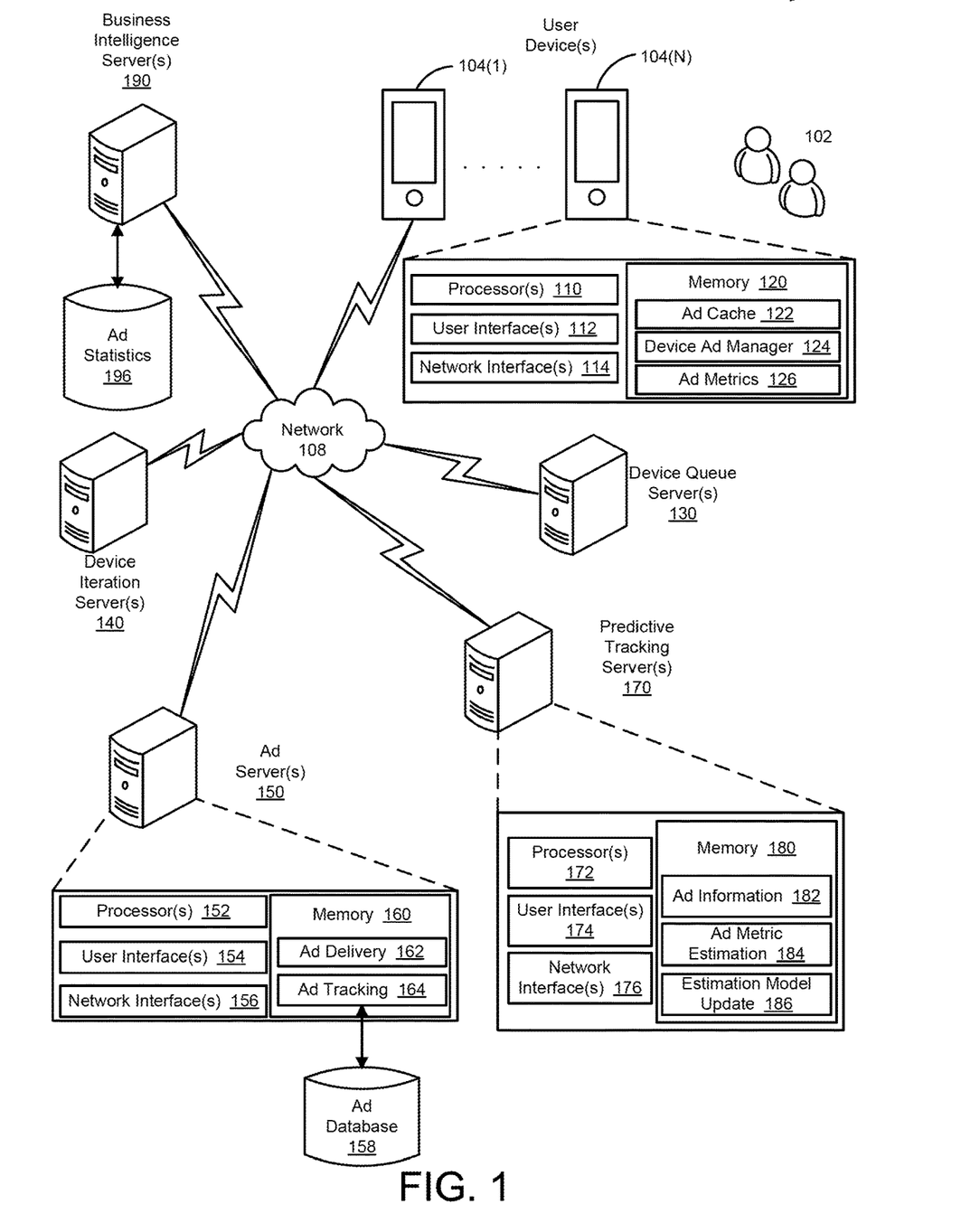
FIG. 1 illustrates an example architecture for providing ad metric prediction, in accordance with embodiments of the disclosure.

FIG. 1 depicts an illustrative system or architecture 100 in which techniques for providing ad metric prediction and ad delivery based thereon may be performed. The architecture 100 may include one or more users 102 that may interact with at least one user device 104(1)-104(N) (collectively, user devices 104) to request services provided by the user devices 104. The user devices 104 may be configured to intermittently connect to a network 108. In other words, the user devices 104 may operate without being connected to the network part of the time and may operate while being connected to the network for part of the time.

The users 102 may be individuals or other entities, such as corporations, non-profit organizations, for-profit organizations, government organizations, public sector organizations, or any of the aforementioned entities located in this country or foreign countries. The user devices 104 may be any one of suitable devices that may be configured to access the web service computers via the network 108. The user device 104 may include, but is not limited to, a personal computer, a desktop computer, a notebook computer, a laptop computer, a personal digital assistant, an electronic book (ebook) reader, a tablet computing device, a pad computing device, a smartphone, or combinations thereof. The user device 104 may include one or more processors 110 to execute and/or operate one or more instructions, applications, and/or software on the user device to provide services to the user 102 of the user device 104. The user devices 104 may further include one or more user interfaces 112 to accept user 102 input, provide output to the user 102, and/or otherwise provide a mechanism for the user 102 to interact with the user device 104. The user interfaces 112 of the user device 104 may include, but are not limited to, one or more user input/output interfaces, such as a display, a touch sensitive display, a speaker, a haptic output, or the like. The one or more user interfaces 112 on the user device 104 may be used by the user 102 to interact with services and/or applications operating on the user device. In other words, the user device 104 may be able to render any variety of services to the user 102 by executing a variety of instructions and/or applications. For example, the user devices 104 may be configured to run instructions, such as an application program stored on one or more memories 120 of the user devices 104, on the one or more processors 110 of the user devices 104 to display one or more websites and/or web services on the display of the user devices 104. The user devices 104 may yet further include one or more network interfaces 114 for accessing the network 108. In one aspect, instructions stored on the network interfaces 114 may enable the processors 110 to interact with other entities of the architecture 100 via the network 108.

In some examples, the processors 110 of the user device 104 may be implemented as appropriate in hardware, software, firmware, or combinations thereof. Software or firmware implementations of the processors 110 may include computer-executable or machine-executable instructions written in any suitable programming language to perform the various functions described. Hardware implementations of the processors 110 may be configured to execute computer-executable or machine-executable instructions to perform the various functions described.

The memory 120 of the user device 104 may further include an ad cache 122, a device ad manager module 124, and/or an ad metrics module 126. The memory 120 may, in certain aspects, store program instructions and/or data, such as in modules 124, 126 and/or caches 122, that are loadable and executable on the processor(s) 110, as well as data generated or received during the execution of these programs. Depending on the configuration and type of user devices 104, the memory 120 may be volatile (such as random access memory (RAM)) and/or non-volatile (such as read-only memory (ROM), flash memory, etc.). Each of the modules and/or software may provide functionality for the user devices 104, when executed by the processors 110. The modules and/or the software may or may not correspond to physical locations and/or addresses in the memory 120. In other words, the contents of each of the modules may not be segregated from each other and may, in fact, be stored in at least partially interleaved positions on the memory 120.

The ad cache 122 may have one or more ads stored thereon. The processors 110 may be configured to access the ads stored on the ad cache 122 to display the ads on the user interfaces 112 of the user device 104, when the user device 104 is being used by a user 102. In certain embodiments, the processors 110 may be configured to display one or more ads that are stored in the ad cache 122 when the user device 104 is not connected to the network 108. The processors 110 may further be configured to receive new ads, such as via network 108, and store the new ads in the ad cache 122. The processors 110 may yet further be configured to receive messages and/or instructions to purge one or more ads from the ad cache 122 and, responsive to the messages and/or instructions, may purge and/or erase one or more ads from the ad cache 122.

The device ad manager module 124 may have instructions and/or code stored thereon that may be executed by the processors 110 to access and display one or more ads stored in the ad cache 122 of the user device 104, such as on the user interface 112. In certain embodiments, the ads may be displayed on the user interface 112 of the user device 104 when the user device 104 is not connected to the network 108. The device ad manager module 124 may further include instructions and/or code that may be executed by the processors 110 to update the ads stored in the ad cache 122. In one aspect, these instructions and/or code may configure the processors 110 to receive new ads and/or instructions via the network 108 for the purposes of updating ads that are stored in the ad cache 122. Further still, the device ad manager module 124 may include instructions and/or code that may be executed by the processors 110 to schedule a time for the user device 104 to connect to the network 108 and other entities of architecture 100 to update the ads stored in the ad cache 122.

The ad metrics module 126 may have instructions and/or code stored thereon that may be executed by the processors 110 to track metrics associated with ads that are stored in the ad cache 122 and/or displayed by the user device 104, such as on the user interface 112. The tracked metrics may be of any variety, such as, for example, the number of impressions of a particular ad or the number of interactions the user 102 may have with a particular ad. In certain embodiments, the ad-related metrics may be tracked and/or tallied while the user device 104 is not connected to a network 108. The ad-related metrics may be reset if the user device 104 transmits the ad-related metrics via the network 108 when the user device 104 connects to the network 108. In other embodiments, the ad-related metrics may not be reset upon the user device 104 transmitting updates of the ad metrics via the network 108. In certain embodiments, the ad metrics may be tallied for each individual ad that is currently stored in the ad cache 122 of the user device 104. In certain further embodiments, when the user device 104 connects to the network 108, such as on a periodic basis, the processors 110 may receive a message and/or instructions to transmit current measured metrics associated with ads that are stored on the user device 104.

The networks 108 may include any one or a combination of different types of suitable communications networks, such as cable networks, the Internet, wireless networks, cellular networks, and other private and/or public networks. Furthermore, the networks 108 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing a website and/or web service over the networks 108, the described techniques may equally apply in instances where the users 102 interact with the user devices 104 over a landline phone, via a kiosk, or in any other manner. It is also noted that the described techniques may apply in other client/server arrangements (e.g., set-top boxes, etc.), as well as in non-client/server arrangements (e.g., locally stored software applications, etc.).

The architecture may further include one or more device queue server(s) 130. The device queue servers 130 may include one or more processor(s) and/or one or more memories storing instructions and/or programs thereon. The instructions and/or programs may be executed by the processors to enable the device queue servers 130 to communicate with the user devices 104 when the user devices are connected to the network 108. In particular the user devices 104 and the device queue servers 130 may be able to communicate with each other via the network 108 or via any other suitable network. In certain embodiments, the device queue servers may be configured to provide the user device with instructions and/or indications of ads to be updated on the user device. In one aspect, the device queue servers 130 may be configured to provide individual instructions and/or indications of ads to be updated on a variety of user devices 104. In other words, individual user devices 104 may receive individual instructions and/or instructions from the device queue servers for ad updates.

The device queue servers 130 may further be configured to receive user device 104 related ad update information from one or more other elements of the architecture 100, such as device iteration servers 140. In other words, the device iteration server may provide the device queue servers 130 with instructions or information related to ads to be updated on particular user devices 104. The device queue servers 130 may receive these user device specific indications and/or instructions via the network 108 or via any other suitable communications channel. In one aspect, the device queue servers 130 may be updated with instructions and/or indications of updates for a particular user device 104 prior to that user device communicating with the device queue server 130. In other words, updates for a particular user device 104 may be determined asynchronously with that user device 104 connecting to the network and/or communicating with the device queue servers 130. Therefore, the ad updates to be made to a particular device may be decided prior to that user device connecting to the device queue servers 130 and the updates may be implemented upon the user device 104 connecting and communicating with the device queue servers 130.

The device iteration servers 140 may be configured to communicate with the device queue servers 130 to update the device queue servers 130 with instructions and/or ad updates for particular user devices 104. The device iteration servers 140 may include one or more processor(s) and/or one or more memories storing instructions and/or programs thereon. The instructions and/or programs may be executed by the processors to enable the device iteration servers 140 to communicate with the device queue servers 130 and or other entities of the architecture 100. Furthermore, the execution of the instructions and/or programs may enable the processors of the device iteration servers 140 to provide other functionality as described herein. The device iteration servers 140 may be configured to determine, such as by accessing one or more device ad databases, ads that may currently be stored and/or queued on a user device 104, such as in the ad cache 122. The device iteration server 140 may be configured to provide information related to ads that are currently stored on a particular user device 104 to other entities of architecture 100, such as an ad server 150. The device iteration server 140 may provide this information via the network 108 or any other suitable communication channel. In certain embodiments, the device iteration server 140 may not be directly accessible by the user devices 104. In certain embodiments, the communications between the device iteration servers 140, the ad servers 150, and/or the device queue servers 130 may be on dedicated channels and may not be accessible by other entities, such as the user devices 104.

The device iteration servers 140 may further be configured to receive instructions and/or indications related to updates of ads for various user devices 104 from the ad servers 150. In one aspect, the ad serves 150 may provide these instructions and/or updates responsive to device related stored ad information provided by the device iteration servers 140 to the ad servers 150. The device iteration servers 140 may further be configured to update the device queue servers 130 based at least in part on the ad instructions and/or update information received from the ad servers 150.

The ad servers 150 may be any type of computing device such as, but not limited to, mobile, desktop, thin-client, server, remote computing, and/or cloud computing devices. In some examples, the ad servers 150 may be in communication with the one or more device iteration servers 140, as well as other computers and/or servers, via the networks 108, or via other network connections. In certain embodiments, the ad servers 150 may include one or more servers, perhaps arranged in a cluster, as a server farm, or as individual servers not associated with one another. These ad servers 150 may be configured to receive, store, and/or process information associated with ads, such as information associated with ads stored and/or displayed on the user devices 104. The ad servers 150 may be further configured to interact with other entities, such as other servers, to determine which ads to provide to and/or update on the user devices 104. The ad servers 150 may yet further be configured to provide indications of new ads to the user devices 104 and/or instruct the removal of old ads from the user devices 104. In other words, the ad servers 150 may be in communications with the device iteration servers 140 and/or the device queue servers 130 and may direct the update of ads on user devices 104. In one aspect, the updates and or instructions to update ads, as determined by the ad servers 150, may be provided to the user device 104 by the device queue server 130 via the device iteration servers 140.

In one illustrative configuration, the ad servers 150 may include one or more processing units (or processor(s)) 152 and at least one memory 160. In some examples, the processor(s) 152 of the ad servers 150 may be implemented as appropriate in hardware, software, firmware, or combinations thereof. Software or firmware implementations of the processor(s) 152 may include computer-executable or machine-executable instructions written in any suitable programming language to perform the various functions described. Hardware implementations of the processor(s) 152 may be configured to execute computer-executable or machine-executable instructions to perform the various functions described.

The memory 160 may store program instructions that are loadable and executable on the processor(s) 152, as well as data generated or received during the execution of these programs. Depending on the configuration and type of ad server 150, the memory 160 may be volatile (such as random access memory (RAM)) and/or non-volatile (such as read-only memory (ROM), flash memory, etc.).

The ad servers 150 may also include input/output (I/O) device(s) or user interface(s) 154, such as a keyboard, a mouse, a pen, a voice input device, a touch input device, a display, speakers, a printer, etc. The ad servers 150 may also include network interfaces(s) 156 that allow the ad servers 150 to communicate with stored databases, other computing devices or servers, user terminals, and/or other devices on the networks 108. The ad servers 150 may further include one or more storage device drivers (not shown) to enable communications with one or more external storage devices and/or databases, such as an ad database 158, as illustrated.

Turning to the contents of the memory 160 in more detail, the memory 160 may include an ad delivery module 162 and/or an ad tracking module 164. Each of the modules and/or software may provide functionality for the ad servers 150, when executed by the processors 152. The modules and/or the software may or may not correspond to physical locations and/or addresses in the memory 160. In other words, the contents of each of the modules may not be segregated from each other and may, in fact, be stored in at least partially interleaved positions on the memory 160.

The processors 152 may be configured to execute instructions and/or computer code stored in the ad delivery module 162 to determine which ads accessible to the ad server 150 may be delivered to one or more user devices 104. In one aspect, the ad delivery module 162 and the instructions stored thereon may be executed by the processors 152 to interact with one or more other entities of the architecture 100 to determine which ads to deliver to particular user devices 104. The processors 152 may be configured to consider estimates of metrics associated with ads that may be delivered to the user devices 104. The ad server 150 and associated processors 152 may receive estimates of metrics associated with ads from other entities such as one or more predictive tracking servers 170. In one aspect, the estimated metrics associated with particular ads and particular user devices 104 may be considered and/or compared to target metrics, such as target metrics agreed to with customers, to determine which ads to deliver to a particular user device 104. The processors 152 may, therefore, be configured to access the ad database 158 or other sources of ads to deliver those ads to the user device 104. In certain embodiments, the ad delivery module 162 and the instructions and/or computer code stored thereon may be executed by the processors 152 to update the device queue servers 130 to provide instructions to update a particular user device by adding or indicating removal of one or more ads. Therefore, the ad server 150 may provide instructions for updating one or more user devices 104 via one or more other entities of architecture 100. In the same or further embodiments, the processors 152 may further be configured to provide messages or instructions to the user device 104 to remove and/or erase one or more ads that may currently be stored on the user device 104, such as in the ad cache 122. Therefore, it will be appreciated that the processors 152, by running instructions and/or computer code stored on the ad delivery module 162, may be able to update ads that are stored on a particular user device 104 by directing both adding and removing ads from that user device 104.

The processors 152 may be further configured to execute the instructions and/or computer code stored in the ad tracking module 164 to track which ads have been delivered to particular user devices 104. By executing the instructions stored on the ad tracking module 164, the processors 152, in certain embodiments, may receive and/or request information associated with ads that may be stored on a particular user device 104. In certain embodiments, the processors 152 may automatically receive information associated with ads that may be stored on a particular user device 104 prior to when that user device 104 connects to the network 108 and/or the device queue server 130. The processors 152 may be configured to receive information associated with ads that may be stored on a particular user device 104, such as in the ad cache 122 of that particular user device 104, from the device iteration servers 140. The received information regarding ads stored on a particular user device 104 may further be shared with applications stored in the ad delivery module 162 and executed by the processors 152 to determine which ads to provide to the user device 104.

It will be appreciated that there may be overlap in the functionality of the instructions stored in the ad delivery module 162 and the ad tracking module 164. In fact, the functions of the ad delivery module 162 and the ad tracking module 164 may interact and cooperate seamlessly under the framework of the ad servers 130. Indeed, each of the functions described for either module 162, 164 may be stored in either module 162, 164 in accordance with certain embodiments of the disclosure. Further, in certain embodiments, there may be one single module that includes the instructions, programs, and/or applications described within the ad delivery module 162 and the ad tracking module 164.

The ad database 158 may include removable storage and/or non-removable storage. The ad database 158 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 140 may include multiple different types of memory, such as static random access memory (SRAM), dynamic random access memory (DRAM), and/or ROM.

The memory 170 and/or the ad database 158, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

The predictive tracking servers 170 may be communicatively coupled to the ad servers 150 and other entities of the architecture 100 via the network 108. Alternatively, the predictive tracking servers 170 may be communicatively coupled to the ad server 150 via communicative channels other than network 108. In such communicative topographies, the predictive tracking servers 170 and/or the ad servers 150 may not readily be accessible by other entities of the architecture 100, such as the user devices 104. The predictive tracking servers 170 may be configured to provide estimates of metrics associated with ads that may be queued for delivery by the ad servers 150 to one or more user devices 104. In one aspect, the predictive tracking servers 170 may have models and/or other tools that may enable the predictive tracking servers 170 to generate estimates of metrics associated with one or more ads and/or one or more user devices 104. In further aspects, the predictive tracking servers 170 may be configured to provide the one or more ad metric estimates to the ad servers 150.

In one illustrative configuration, the predictive tracking servers 170 may include one or more processing units (or processor(s)) 172 and at least one memory 180. In some examples, the processor(s) 172 of the predictive tracking servers 170 may be implemented as appropriate in hardware, software, firmware, or combinations thereof. Software or firmware implementations of the processor(s) 172 may include computer-executable or machine-executable instructions written in any suitable programming language to perform the various functions described. Hardware implementations of the processor(s) 172 may be configured to execute computer-executable or machine-executable instructions to perform the various functions described.

The memory 180 may store program instructions that are loadable and executable on the processor(s) 172, as well as data generated or received during the execution of these programs. Depending on the configuration and type of predictive tracking servers 170, the memory 180 may be volatile (such as random access memory (RAM)) and/or non-volatile (such as read-only memory (ROM), flash memory, etc.).

The predictive tracking servers 170 may also include input/output (I/O) device(s) or user interface(s) 174, such as a keyboard, a mouse, a pen, a voice input device, a touch input device, a display, speakers, a printer, etc. The predictive tracking servers 170 may also include network interfaces(s) 176 that may allow the predictive tracking servers 170 to communicate with stored databases, other computing devices or servers, user terminals, and/or other devices on the networks 108.

Turning to the contents of the memory 180 of the predictive tracking servers 170 in more detail, the memory 180 may include an ad information module 182, an ad metric estimation module 184, and/or an estimation model update module 186. Each of the modules and/or software may provide functionality for the predictive tracking servers 170, when executed by the processors 172. The modules and/or the software may or may not correspond to physical locations and/or addresses in the memory 180. In other words, the contents of each of the modules may not be segregated from each other and may, in fact, be stored in at least partially interleaved positions on the memory 180.

The ad information module 182 may have information related to one or more ads that may be queued for delivery by the device queue servers 130 by the ad servers 150 stored therein. In certain embodiments, the ad information module 182 may enable the processors 172 to receive one or more types of information associated with an ad and/or the user device 104 via the network 108, such as from ad server 150. This information may include, for example, identifiers of the one or more ads and/or identifiers of one or more user devices 104. In one aspect, the ad information module 182 may pass on information received from the ad servers 150 to applications stored in the ad metric estimation module 184 and executed by the processors 172. Additionally, the ad information module 182 may have instructions and/or computer code stored therein that may be executed by the processors 172 to transmit information, such as estimates of ad metrics, associated with particular ads and/or particular user devices 104. This estimate-related information may be transmitted, in certain embodiments, to the ad server 150, such as for the purposes of determining which ads should be delivered to particular user devices 104. In certain embodiments, the ad information module 182 may have data and/or instructions stored therein that may be accessed and/or executed by the processors 172 to transmit one or more models associated with estimating parameters and/or metrics associated with one or more ads that may be delivered by the ad server 150 to one or more user devices 104.

The ad metric estimation module 184 may have instructions and/or data stored thereon that may be accessed and/or executed by the processors 172 to generate one or more estimates of metrics associated with one or more ads that may be delivered by the ad server 150 to one or more user devices 104. In certain embodiments, the estimates may be based on an identifier of the particular ad and/or the type of user device 104 to which the ad may be delivered. In these and further embodiments, the estimates of the metrics may include at least estimates of the impressions of the ad. In other words, estimates of how many times a particular ad is displayed on a particular user device 104 may be determined and/or provided. In further embodiments, the estimates may be based on further parameters, such as demographic information of the user 102 associated with the particular user device 104. Further parameters that may be used to generate estimates of ad-related metrics may include the geographical region where the particular user device 104 is located and/or operating. It will be appreciated, that some estimating processes may require more information than others. For example, if user demographics are used in generating estimates of metrics, then such demographic information may be required by the processors 172. In certain embodiments, the ad metric estimation module 184 may have one or more estimation models associated with corresponding respective metrics stored therein. These models may be of any variety, such as linear models, continuous models, regression models, or the like.

The estimation model update module 186 may have instructions and/or data stored thereon that may be accessed and/or executed by the processors 172 to update one or more models corresponding to one or more metrics associated with ads that may be delivered to the user device 104. In one aspect, updates to estimation models may be received by the predictive tracking servers 170 via the network 108 from one or more other entities of the architecture 100. It will be appreciated that in certain embodiments, the communications associated with receiving updates to estimation models may be via channels other than the network 108. Updated metric estimation models may be received by the predictive tracking servers 170 when more accurate and/or precise models for tracking metrics associated with ads may be generated based upon comparing tracked metrics such as those tracked by the ad metrics module 126 of the user device 104, to predictions of metrics made by the ad metric estimation module 184 of the predictive tracking servers 170.

The architecture 100 may further include business intelligence servers 190 that may have access to an ad statistics database 196. The business intelligence servers 190 may receive ad-related metrics from the user device 104, such as when the user device 104 connects to a network 108 or at any other suitable time. The ad metrics received by the business intelligence servers 190 may be generated by the user device 104 using instructions and/or applications stored on the ad metrics module 126 and executed by processors 110 of the user device 104. In certain embodiments, the business intelligence servers 190 may receive ad metrics tallied by the user device 104 directly from the user device 104. In other embodiments, the business intelligence servers 190 may receive ad metrics tallied by the user devices 104 indirectly, such as via the ad server 150. In other words, the user device 104, when connected to a network 108, may provide the ad server 150 with actual metrics related to ads that may be stored on the user device 104 and, subsequently, the ad servers 150 may provide the metrics to the business intelligence servers 190. The business intelligence servers 190 may store one or more of the received metrics in the ad statistics database 196.

The business intelligence servers 190 may include one or more processors (not shown) and/or one or more memories (not shown). The processors may be configured to receive and/or analyze actual metrics associated with ads displayed on user devices 104 and may compare the actual metrics to estimations of the metrics generated by one or more models for estimating metrics associated with the ads. The comparisons and the analysis may be used to update or otherwise modify the models used to estimate the metrics associated with the ads. In certain aspects, particular parameters of the estimation models may be tweaked and/or modified. In certain embodiments, the business intelligence servers 190 may be further configured to receive user-based input to modify and/or update the ad metric estimation models. Metric estimation models may predict ad-related metrics based upon a variety of input parameters including, but not limited to, user device type, type of ads, user device usage information, user demographic information, or the like. In certain embodiments, the initial metric estimation model associated with a particular user device 104 may be generated by the business intelligence servers 190.

The business intelligence servers 190 may be further configured to transmit modified or updated ad metric estimation models to other entities of the architecture 100. In one aspect, the business intelligence servers 190 may transmit the updated ad metric estimation models to the predictive tracking servers 170 for the purposes of generating accurate and/or precise estimations of ad metrics associated with the user devices 104.

Illustrative Processes

Embodiments of the disclosure may include methods for providing updated or new ads to user devices 104 based at least in part on estimations of metrics associated with the ads and/or the user devices 104. These user devices 104 may only intermittently connect to networks 108, such as on a daily basis, to receive updates to ads that the user device 104 may display to the user 102 while the user 102 uses services provided by the user device 104. In certain embodiments, the user devices 104 may display or otherwise render ads on one or more user interfaces 112 of the user device 104 while the user device 104 is not connected to the network 108. The user device 104 may further track metrics associated with one or more ads that are displayed on the user interface 112 while the user device 104 is not connected to a network 108.

In certain embodiments, when the user device 104 connects to the network 108, the user device 104 may interact with the device queue server 130. The user device 104 may provide information related to ads that may be stored on the user device 104, such as in the ad cache 122 of the user device 104. Alternatively, the device iteration servers 140 may be able to determine the ads that may be on a particular user device 104, such as by accessing a device ad database. In certain embodiments, the ad servers 150 may have available to them one or more estimates of ad metrics associated with ads that may be provided to the user devices 104. The ad metric estimates may be provided to the ad servers 150 by the predictive tracking servers 170 which may determine the ad metric estimates based upon one or more models associated with the metrics. In certain embodiments, the one or more models used to determine ad metric estimates by the predictive tracking servers 170 may be updated for the purposes of providing more accurate and/or precise estimates of the metrics.

Figure 2:
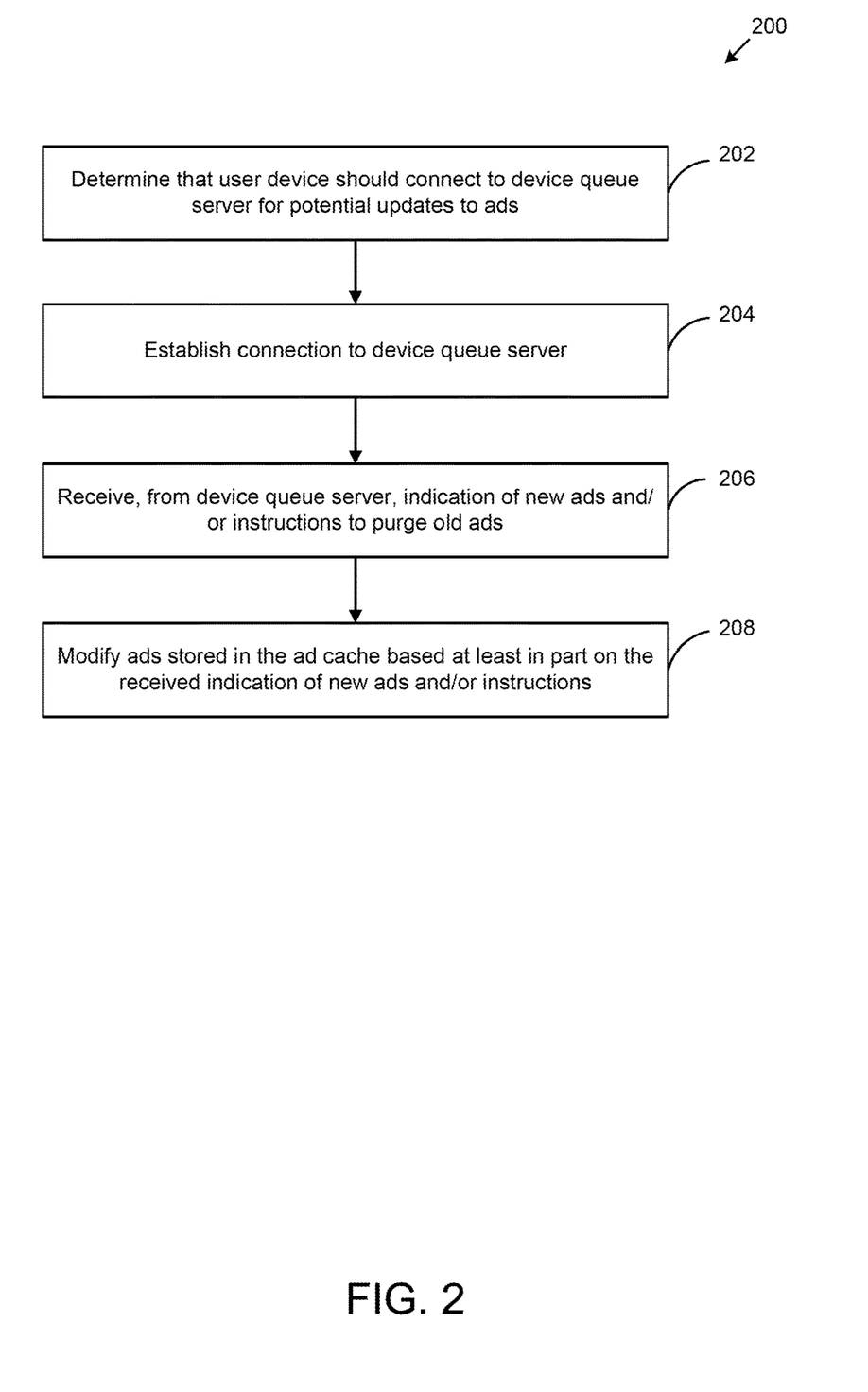
FIG. 2 illustrates a flow diagram representing an example method for updating cached ads on a user device, in accordance with embodiments of the disclosure.

Referring now to FIG. 2, an example method 200 for updating cached ads available for display on the user device in accordance with embodiments of the disclosure as discussed. The method 200 may be performed by a user device 104. In some cases, some elements of the method 200 may be performed while the user device 104 is connected to the network 108, and other elements of the method 200 may be performed while the user device 104 is not connected to the network 108.

At block 202, it may be determined that the user device should connect to the device queue server for potential updates to ads. In one aspect, this determination may be based on a periodic schedule for the user device 104 to connect with the device queue servers 130. For example, the user device 104 may be scheduled to connect with the device queue severs 130 on a daily basis to receive instructions to potentially update ads stored on the user device 104. Alternatively, the user device 104 may connect to the device queue servers 130 responsive to receiving instructions to do so from one or more entities of the architecture 100.

At block 204, a connection may be established with the device queue server 130. The connection may be via the network 108. In one aspect, the connection may be established when the user device 104 may need to connect with one or more other entities of the architecture 100. The user device 104 may need to connect to the network 108 for any variety of reasons including, for example, downloading data, information, and/or applications needed by the user device 104 to render services to the user 102. As a non-limiting example, the user device 104 may be an e-book reader that may connect to the network 108 to download the text of a book to render to the user 102 of the e-book reader. In this and other examples, the user device 104 may not always be connected to the network 108 or to other entities of the architecture 100, such as the ad server 150. Indeed, the user device 104 may only connect when the user device 104 needs to download one or more items via the network 108, or at predetermined or prescheduled times. For example the user device 104 may connect to the network and entities of the architecture 100, such as the device queue server 130 on a periodic basis, such as on a daily basis.

At block 206, indications of new ads and/or instructions to purge old ads may be received from the device queue server 130. In certain embodiments, the indications of new ads may be in the form of identifiers, such as numerical and/or alphanumerical identifiers, that may identify the ads to be added and/or removed from the user device 104. In one aspect, the indications of new ads to be added may be transmitted in the form of one or more data packets. In certain embodiments, the new ads may include the content of the ads in addition to metadata associated with the ads that may identify the ads and properties thereof. Instructions to purge old ads may also be received in the form of data packets. The instructions may include an identifier of an ad to be purged from the user device 104 such as from the ad cache 122. In some cases, ads that are identified for removal or purging may not be explicitly removed by a user device 104, but instead may be written over by new ads that may be received by the user device 104.

At block 208, the ads stored in the ad cache may be modified based at least in part on the newly received indication of ads and/or instructions to purge old ads. In one aspect, the new ads may be stored in the ad cache 122 of the user device 104. Additionally, the ads that are indicated to be purged may be purged from the ad cache 122 and/or written over by new ads received by the user device based in part on the instructions received by the user device from the device queue servers 130. The user device may download the ads to be added from one or more ad databases and or repositories for ads, such as ad database 158.

It should be further noted that the user device 104 may transmit stored metrics to the business intelligence server 190. In one aspect, the stored metrics may be actual measured metrics associated with ads that were displayed to the user 102 of the user device 104 while the user device 104 was not connected to the network 108 or to the device queue servers 130. These measured metrics may be used by the business intelligence server 190 to determine the accuracy, the precision, and/or the overall performance of the models that may be used for determining estimates of metrics associated with ads that may be displayed on user device 104. In certain embodiments, the measured metrics may be used to update statistics that may be used for further refining the estimate models in ad statistics database 196. In certain embodiments, the stored metrics may be transmitted at the same time as when the user device 104 receives instructions and/or indications of updates to ads stored thereon from the device queue servers 130. In other embodiments, the download of the stored metrics may be at a different instance than when the user device 104 receives instructions to update and/or modify ads stored thereon. In some cases, the user device 104 may communicate directly with the business intelligence server 190 to provide the stored metrics. In other cases, the communications may be via one or more other entities of architecture 100, such as the device queue servers 130 and/or the device iteration servers 140, to transfer the stored metrics from the user device 104 to the business intelligence servers 190.

It should be noted that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure.

Figure 3:
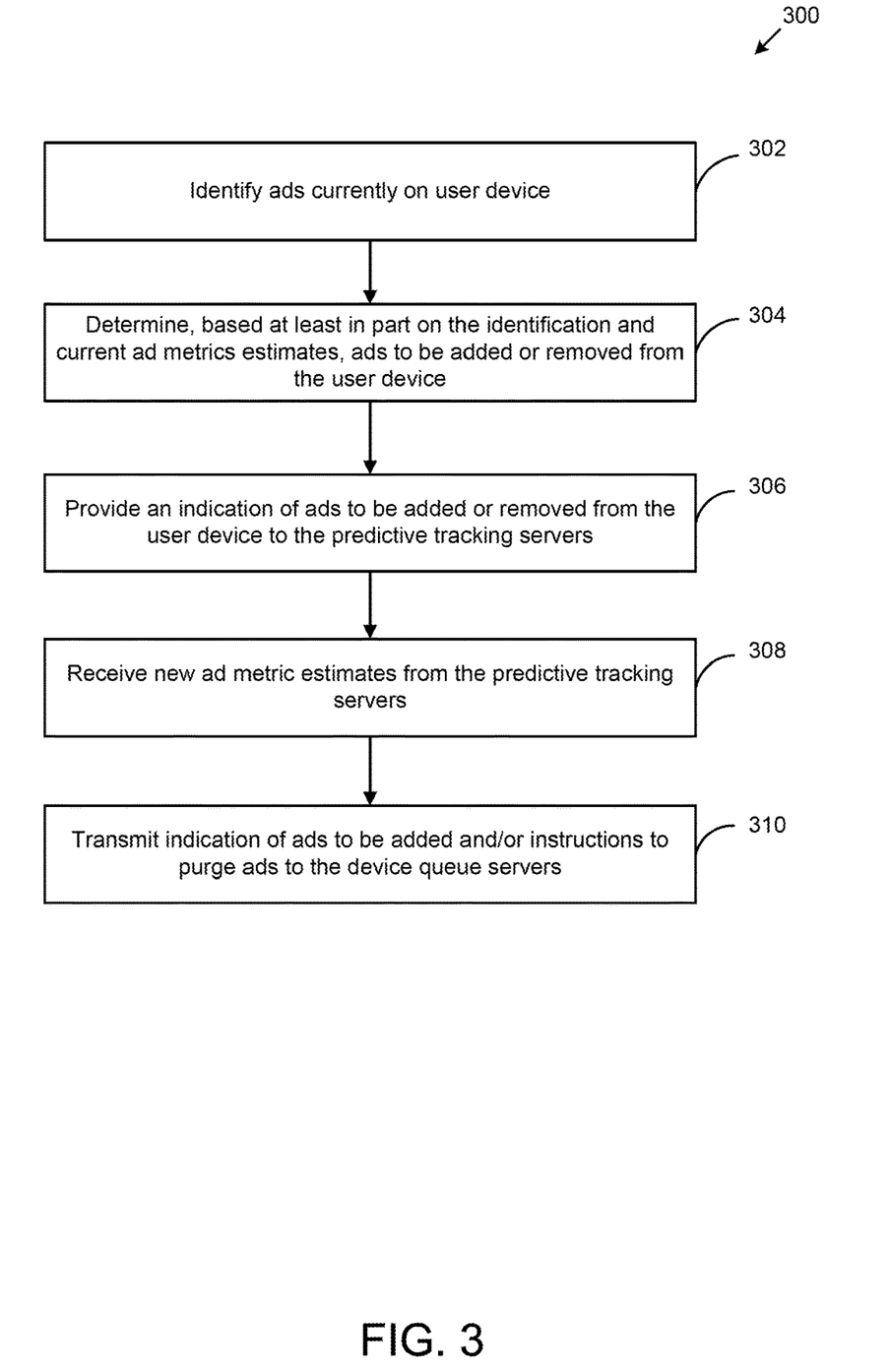
FIG. 3 illustrates another flow diagram representing an example method for adding or removing ads from a user device, in accordance with embodiments of the disclosure.

Referring now to FIG. 3, an example method 300 for adding or removing ads from the user device 104 is described. The method 300 may be performed by the ad servers 130 or any appropriate entities of the architecture 100. At block 302, ads currently on a particular user device may be identified. It should be noted, as described above, that the user device 104 may not always be connected to a network 108 and/or to the device queue servers 130. Therefore, the messages and/or indications indicating the ads stored on the user device 104 may be received by the ad servers 130 in an asynchronous fashion, such as while the user device is not connected to the network 108 and/or the device queue servers 130. The ad server 150 may receive an indication of ads stored on a particular user device 104 from the device iteration server 140. The device iteration server 140 may access one or more device ad databases to ascertain what ads are currently stored and/or cached on the user device 104.

It will be appreciated that ads that may be identified by the ad servers 140 may have identifiers associated therewith. In some cases, these identifiers may uniquely identify the ads that have been, are being, or will be distributed to user devices 104. In one aspect, the user devices 104 and the ad servers 150 may use the same identifiers to identify the ads that may be received by the user devices 104, may be stored on the user devices 104, or may be transmitted by the ad servers 150. Therefore, messages and/or indications indicating ads currently stored on the user device 104 that is received by the ad servers 150 may contain one or more identifiers that identify each of the ads cached on the user device 104. In one aspect, the message indicating the ads stored on the user device 104 may be in the form of one or more data packets that may be transmitted via the network 108 or any other suitable communications channel to the ad servers 150. These one or more data packets may further include headers and/or footer information, such as routing information and/or parity check information.

At block 304, it may be determined, based at least in part on the identification of ads on the user device and current ad metrics estimates, which ads to add or remove from the user device. The ad servers 150, therefore, may have current estimates of metrics associated with the ads that may be stored on the user device 104. For example, the ad servers 150 may have estimates of the number of impressions of the ads stored on the user device 104. The ad servers 150 may further estimate metrics associated with ads that may be added or removed from the user device 104 based upon the ad metric estimates available to the ad servers 150. For example, the ad servers 150 may be able to determine changes in the number of impressions of an ad that is provided on the user device 104. The ad servers 150 may further be able to determine changes in the number of impressions of an ad that is currently on the user device 104 and that will remain on the user device 104. In such an estimation, other ads that are available on the user device 104 may be considered in determining the estimates of impressions of a particular ad. Continuing with this example, consider that a user device 104 may have a first, second, and third ad stored thereon. The ad servers 150 may be able to determine estimates of impressions of the first, second, and third ads, when a fourth ad is added to the user device 104. In effect, the ad servers 150 may be able to estimate impressions of all four ads that may be on the user device 104.

When the ad servers 150 determine which ads to update or change on the user device 104 at block 304, at block 306, the ad servers 150 may provide an indication of ads to be added or removed from the user device to the predictive tracking servers. In one aspect, the predictive tracking servers 170 may be able to update and/or improve estimates of ad metrics based upon the information supplied by the ad servers 150 related to ads that have been updated on particular user devices 104 and associated user device types. In effect, the predictive tracking servers 170 may use the information provided by the ad servers 150 to continuously and/or repeatedly update ad metrics as the ad servers 150 continue to provide updated information associated with user devices 104. In certain embodiments, the ad servers 150 may provide the indication of ads added or removed from the user device 104 to the predictive tracking servers 190 in the form of one or more data packets containing identifiers of the added and/or removed ads.

At block 308, the ad servers 150 may receive new ad metric estimates from the predictive tracking servers. In one aspect, the new estimates may be based upon information provided to the predictive tracking servers 170 at block 306. In certain embodiments, the ad servers 150 may not receive updates to the metric estimates every time ad update information for particular user device 104 is provided to the predictive tracking servers 170. Instead, in these embodiments, the ad servers 150 may receive new ad metric estimates on a periodic basis, such as, for example, on an hourly basis. It will be appreciated, that the new estimates will reflect the update to ads made by the ad servers 150 to a variety of user devices 104.

At block 310, the ad servers 150 may transmit indication of new ads and/or instructions to purge ads to the device queue servers 130. The ad servers 150 may provide these indications and/or instructions to the device queue servers 130 to provide to the user device 104 when the user device 104 connects to the device queue servers 130. The ad servers 150 may transmit the indication of new ads to be added to the ad cache 122 of the user device 104 in the form of one or more data packets. The transmission of the indication of new ads by the ad servers 150 may further include transmission of metadata associated with new ads, such as identifiers of the ads. Instructions to purge ads from the user device 104, particularly from the ad cache 122, may also be in the form of one or more data packets indicative of identifiers of ads that should be removed from the user device 104 or otherwise no longer used by the user device 104. In some cases, the ads that are to be purged from the user device 104 may not immediately be purged, but instead new ads may be written over the ads that are to be purged. In effect, by adding new ads and/or instructing the removal of old ads, the ad servers 150 are able to update the ads that are stored on the user device 104. Therefore, when the user device 104 connects to the network 108, such as to the device queue servers 130, the ads on the user device 104 may be updated. In certain embodiments, the ad servers 150 may consider one or more estimates of metrics associated with ads that may currently be on the user device 104 or may be considered for addition or removal from the user device 104. In these or further embodiments, the ad servers 150 may consider current estimates of ad metrics compared to overall target metrics associated with those ads when determining which ads to provide to the user device 104.

Figure 4:
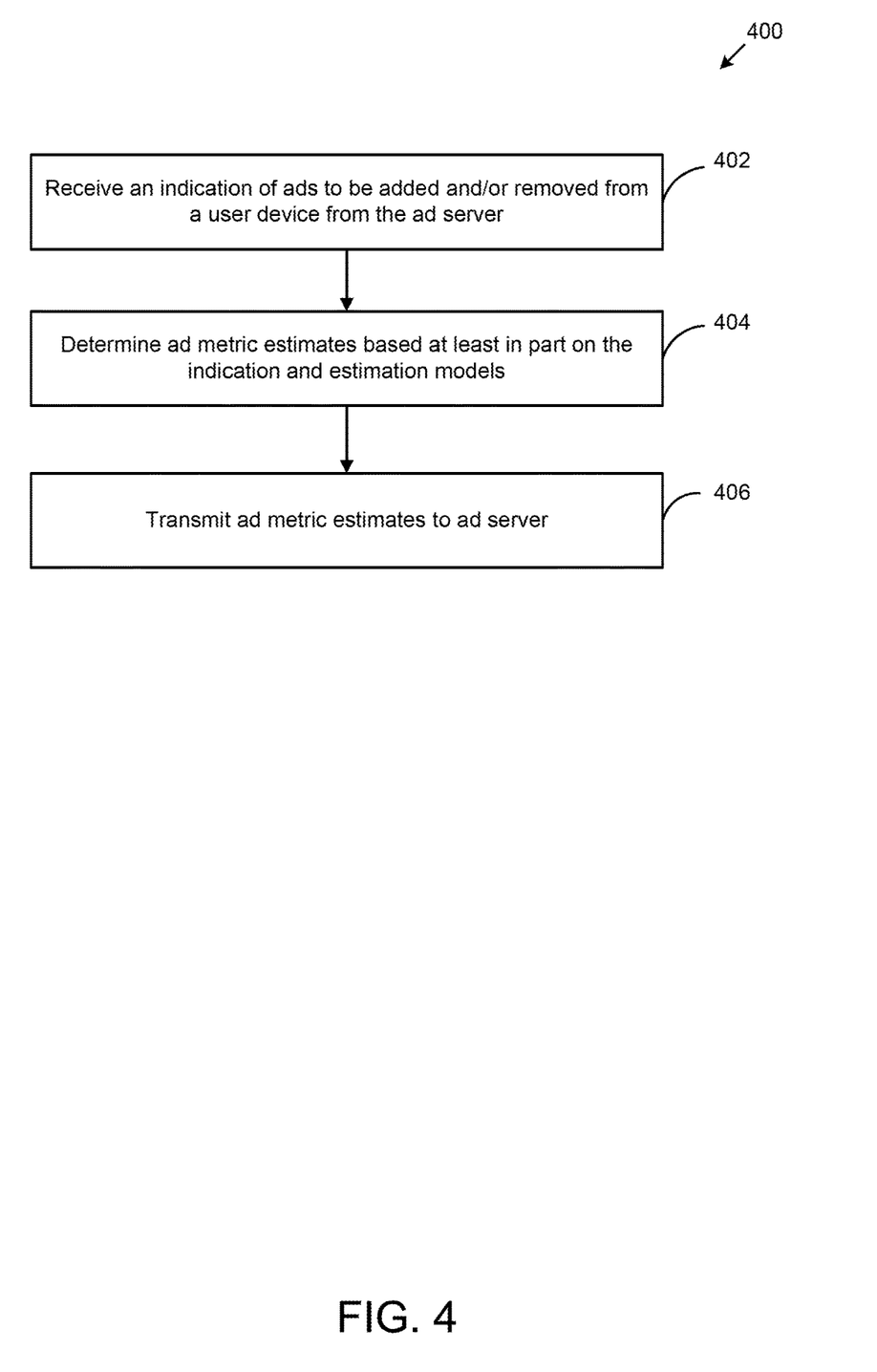
FIG. 4 illustrates a flow diagram representing an example method for providing ad metric estimates, in accordance with embodiments of the disclosure.

Referring now to FIG. 4, an example method 400 for transmitting ad metric estimates to an ad server is described. The method 400 may be performed by the predictive tracking servers 170 to provide updated and/or improved estimates of ad metrics associated with particular ads and/or particular user devices 104 and associated user device types.

At block 402, the predictive tracking servers may receive an indication of ads to be added and/or removed from the user device from the ad server. This process is similar to the process described in block 306 of method 300, as shown in FIG. 3. The received indication may be in the form of one or more data packets indicating an identifier of ads that are removed and/or added to a particular user device 104. The received indication of ad updates may also include an identifier of the user device 104 that may be indicative of the user device type. For example, the predictive tracking servers 170 may be able to determine, based at least in part on the received indication of ad updates, the type of device on which the ads have been updated, such as, for example, an e-book reader. In certain embodiments, there may be a variety of granularity in discerning the type of device on which ads have been updated. For example, the predictive tracking servers 170 may be able to discern between different varieties of e-book readers, such as an Amazon® Kindle® eInk® or a Kindle® Fire®.

At block 404, ad metric estimates may be determined based at least in part on the indication received at block 402 and one or more metric estimation models. As discussed above, the ad metric estimation models may be stored in the ad metric estimation module 184 of the memory 180 of the predictive tracking servers 170. In certain embodiments, the estimates of metrics, such as impressions of a particular ad, may be determined based upon the type of user device on which the ad is to be displayed. For example, a Kindle® Fire® may have different metric estimation models than a Kindle® eInk® may have associated therewith. In the same or further embodiments, the metrics associated with a particular ad may further be a function of other ads that may be stored on the user device 104 and displayed to the user 102 of the user device 104. In yet further embodiments, the estimates of metrics associated with ads may further be based on the particular user device 104 and/or the user 102 of the user device 104 and any associated demographic information. In these embodiments, two user devices 104 with identical device types and identical ads may have different estimated metrics for the ads on those user devices 104.

At block 406, the predictive tracking servers 170 may transmit the estimates of the ad metrics. The estimates, in certain embodiments, may be provided to the ad servers 150. As described above, the transmission of the estimates may be in the form of one or more data packets transmitted from the predictive tracking servers 170 and received by the ad servers 150 via the network 108.

It should be noted that the method 400 may be modified in various ways in accordance with certain embodiments of the disclosure. For example, one or more operations of the method 400 may be eliminated or executed out of order in other embodiments of the disclosure. Additionally, other operations may be added to the method 400 in accordance with other embodiments of the disclosure.

Figure 5:
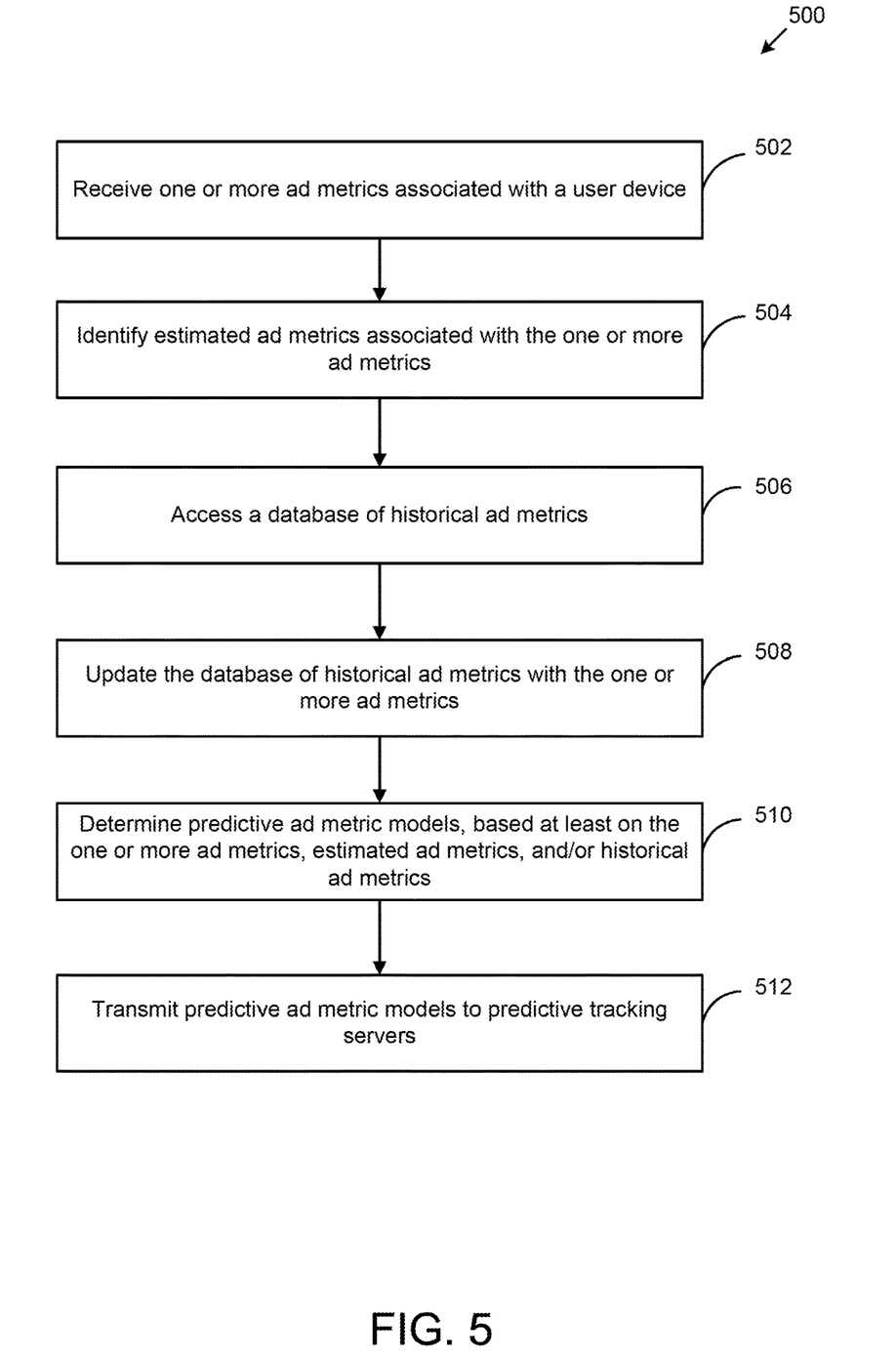
FIG. 5 illustrates a flow diagram representing an example method for providing predictive ad metric models, in accordance with embodiments of the disclosure.

Referring now to FIG. 5, an example method 500 for providing and updating ad metric estimation models in accordance with embodiments of the disclosure is discussed. The processes of method 500 may, in certain embodiments, be performed by the business intelligence servers 190. At block 502, one or more ad metrics associated with the user device may be received. These ad metrics may be actual measured data associated with ads that are displayed on the user device 104 while the user device 104 is not connected to a network 108 or to the device queue servers 130. These ad metrics may be directly received from the user device 104 via the network 108. Alternatively, these ad metrics may be received from the device iteration servers 140 that may receive the measured metrics from the user device 104, via the device queue servers 130. In other words, the measured metrics may be received by the business intelligence servers 190 either directly or indirectly from the user device 104.

At block 504, estimates associated with the one or more received ad metrics may be identified. In one aspect, these estimates of the ad metrics may be estimates that were determined prior to receiving the actual ad metrics from a particular user device 104. At blocks 506 and 508, the business intelligence servers 190 may access and update a database of historical ad metrics with the ad metrics received at block 502. In one aspect, the raw metric data may be stored in the ad statistics database 196. Alternatively, the received metric data may be used to update one or more parameters that are stored in the ad statistics database 196. For example, if the number of impressions for a particular ad and for a particular type of user device is received at block 502, then the business intelligence server 190 may update an average for the impressions of that particular ad and that particular type of user device in the ad statistics database 196.

At block 510, predictive ad metric models may be updated or created based at least in part on the one or more ad metrics, estimated ad metrics, and/or historical ad metric data. In one aspect, updated ad metric statistics available in the ad statistics database 196 may be compared to predictions from current predictive ad metric models. The comparison may further be used to update and/or tweak the current predictive models to generate new predictive models that may be more accurate, concise, or otherwise improved compared to the previous predictive models. In certain embodiments, if previous models do not exist then new predictive models may be generated for that particular ad metric and/or user device type. At block 512, the predictive ad metric models may be transmitted to the predictive tracking servers 170. The predictive tracking servers 170 may, as a result, have new and/or updated metric estimation models to provide more accurate and/or precise ad metric estimations.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method comprising:
  determining, by one or more processors coupled to memory, a first set of ads on a first semi-connected device that were presented at the first semi-connected device while the first semi-connected device was disconnected from a network;
  determining a first device identifier associated with the first semi-connected device;
  determining, based at least in part on the first device identifier, a first estimated number of ad impressions for a first ad of a set of ads, wherein the first estimated number of ad impressions represents an estimated number of impressions the first ad will receive on the first semi-connected device while the first semi-connected device is disconnected from the network, wherein the determination of the first estimated number of ad impressions is made prior to the first ad being sent to the device, and wherein the first estimated number of ad impressions is more than one ad impression;
  determining, based at least in part on the first estimated number of ad impressions, that the first semi-connected device is to be updated with the first ad;
  causing, after determining that the first semi-connected device is to be updated with the first ad, the first ad to be sent to the first semi-connected device; and
  causing at least one ad of the first set of ads to be removed from the first semi-connected device.

2. The method of claim 1, further comprising:
  determining a second device identifier associated a second semi-connected device; and
  determining, based at least in part on the second device identifier, a second estimated number of ad impressions for the first ad, wherein the second estimated number of ad impressions represents an estimated number of impressions of the first ad that, if the first ad is sent to the second semi-connected device, will be presented at the second semi-connected device while the second semi-connected device is disconnected from the network;
  wherein the second estimated number of ad impressions is different than the first estimated number of ad impressions.

3. The method of claim 2, further comprising:
  determining a user account identifier associated with the first semi-connected device; and
  determining that the second semi-connected device is associated with the user account identifier.

4. The method of claim 2, wherein the first semi-connected device is a first device type, and the second semi-connected device is a second device type.

5. The method of claim 2, further comprising:
  determining, based at least in part on the second estimated number of ad impressions, that the second semi-connected device is to be updated with the first ad;
  causing the first ad to be sent to the second semi-connected device; and
  causing at least one ad to be removed from the second semi-connected device.

6. The method of claim 1, further comprising:
  causing the at least one ad of the first set of ads to be removed from the semi-connected device comprises transmitting an ad identifier associated with the at least one ad to be removed from an advertisement cache of the semi-connected device.

7. The method of claim 1, further comprising:
  transmitting an indication of the set of ads to a predictive tracking server; and
  receiving the first estimated number of ad impressions from the predictive tracking server responsive to transmitting the indication of the set of ads.

8. A method comprising:
  determining, by one or more processors coupled to memory, a first set of ads on a first semi-connected device that were presented at the semi-connected device while the semi-connected device was disconnected from a network;
  determining a set of ads that can be sent to the semi-connected device for presentation at a display of the semi-connected device;
  determining a first estimated number of ad impressions for a first ad of the set of ads, wherein the first estimated number of ad impressions represents an estimated number of impressions the first ad will receive on the first semi-connected device while the first semi-connected device is disconnected from the network, wherein the determination of the first estimated number of ad impressions is made prior to the first ad being sent to the device, and wherein the first estimated number of ad impressions is more than one ad impression;
  determining, based at least in part on the first estimated number of ad impressions, that the semi-connected device is to be updated with the first ad;
  causing, after determining that the semi-connected device is to be updated with the first ad, at least the first ad of the set of ads to be sent to the semi-connected device; and
  causing at least one ad of the first set of ads to be removed from the semi-connected device.

9. The method of claim 8, further comprising:
  determining a device identifier associated with the semi-connected device;
  wherein determining the first estimated number of ad impressions for the first ad of the set of ads comprises determining, based at least in part on the device identifier, the first estimated number of ad impressions for the first ad of the set of ads.

10. The method of claim 8, wherein determining that the semi-connected device is to be updated with the set of ads comprises comparing the first estimated number of ad impressions to one or more ad impression targets.

11. The method of claim 8, wherein causing the at least one ad of the first set of ads to be removed from the semi-connected device comprises transmitting an ad identifier associated with the at least one ad to be removed from an advertisement cache of the semi-connected device.

12. The method of claim 8, wherein the semi-connected device is a first semi-connected device, the method further comprising:
   determining a user account identifier associated with the first semi-connected device; and
   determining that a second semi-connected device is associated with the user account identifier;
   wherein the first semi-connected device is a first device type, and the second semi-connected device is a second device type.

13. The method of claim 8, further comprising:
   transmitting an indication of the set of ads to a predictive tracking server; and
   receiving the first estimated number of ad impressions from the predictive tracking server responsive to transmitting the indication of the set of ads.

14. The method of claim 8, wherein a subsequent connection time of the semi-connected device to the network is unknown.

15. A method comprising:
   determining, by one or more processors coupled to memory, a first set of ads on a first semi-connected device that were presented at the first semi-connected device while the first semi-connected device was disconnected from a network;
   determining a first device identifier associated with the first semi-connected device;
   determining a user account identifier associated with the first semi-connected device;
   determining historical ad impression data associated with the user account identifier;
   determining, based at least in part on the first device identifier and the historical ad impression data, a first estimated number of ad impressions for a first ad, wherein the first estimated number of ad impressions represents an estimated number of impressions the first ad will receive on the first semi-connected device while the first semi-connected device is disconnected from the network, wherein the determination of the first estimated number of ad impressions is made prior to the first ad being sent to the device, and wherein the first estimated number of ad impressions is more than one ad impression;
   determining, based at least in part on the first estimated number of ad impressions, that the first semi-connected device is to be updated with the first ad;
   causing, after determining that the first semi-connected device is to be updated with the first ad, the first ad to be sent to the first semi-connected device; and
   causing at least one ad of the first set of ads to be removed from the first semi-connected device.

16. The method of claim 15, further comprising:
   determining a second device identifier associated a second semi-connected device; and
   determining that the second semi-connected device is associated with the user account identifier;
   wherein the historical ad impression data comprises first historical ad impression data for the first semi-connected device and second historical ad impression data for the second semi-connected device.

17. The method of claim 16, further comprising:
   determining, based at least in part on the second device identifier and the historical ad impression data, a second estimated number of ad impressions for the first ad, wherein the second estimated number of ad impressions represents an estimated number of impressions of the first ad that, if the first ad is sent to the second semi-connected device, will be presented at the second semi-connected device while the second semi-connected device is disconnected from the network;
   wherein the second estimated number of ad impressions is different than the first estimated number of ad impressions.

18. The method of claim 16, wherein the first semi-connected device is a first device type, and the second semi-connected device is a second device type.

19. The method of claim 16, further comprising:
   determining, based at least in part on the second estimated number of ad impressions, that the second semi-connected device is to be updated with the first ad;
   causing the first ad to be sent to the second semi-connected device; and
   causing at least one ad to be removed from the second semi-connected device.

20. The method of claim 15, further comprising:
   transmitting an indication of the first ad to a predictive tracking server; and
receiving the first estimated number of ad impressions from the predictive tracking server responsive to transmitting the indication of the first ad.

* * * * *